United States Patent [19]
Bock et al.

[11] Patent Number: 6,020,419
[45] Date of Patent: Feb. 1, 2000

[54] TRANSPARENT COATING COMPOSITIONS CONTAINING NANOSCALE PARTICLES AND HAVING IMPROVED SCRATCH RESISTANCE

[75] Inventors: Manfred Bock, Leverkusen; Theodor Engbert, Köln; Stefan Groth, Leverkusen; Bernd Klinksiek, Bergisch Gladbach; Philip Yeske, Köln; Gerhard Jonschker, Spiesen-Elversberg; Ulrike Dellwo, Saarbrücken, all of Germany

[73] Assignee: Bayer Aktiengesellschaft, Leverkusen, Germany

[21] Appl. No.: 09/268,851

[22] Filed: Mar. 16, 1999

[30]    Foreign Application Priority Data

Mar. 18, 1998 [DE] Germany ............................ 198 11 790

[51] Int. Cl.⁷ ................................. C08J 3/00; C08K 3/20; C08L 75/00
[52] U.S. Cl. ......................... 524/590; 523/318; 523/319; 524/401; 524/442; 524/492; 524/493; 524/589; 524/591; 524/839; 524/840; 525/123; 525/455
[58] Field of Search ..................................... 523/318, 319; 524/401, 442, 492, 493, 589, 590, 591, 839, 840; 525/123, 455

[56]          References Cited

U.S. PATENT DOCUMENTS

| | | |
|---|---|---|
| 5,358,695 | 10/1994 | Helble et al. ........................... 423/592 |
| 5,447,708 | 9/1995 | Helble et al. ........................... 423/593 |
| 5,614,590 | 3/1997 | Bederke et al. ........................ 525/127 |
| 5,723,518 | 3/1998 | Kahl et al. ............................... 523/324 |
| 5,810,266 | 9/1998 | Nyssen et al. ............................. 241/5 |
| 5,889,065 | 3/1999 | Kirchmeyer et al. ..................... 521/99 |

FOREIGN PATENT DOCUMENTS

| | | |
|---|---|---|
| 0 768 351 | 4/1997 | European Pat. Off. . |
| 0 637 616 | 9/1997 | European Pat. Off. . |

*Primary Examiner*—Patrick D. Niland
*Attorney, Agent, or Firm*—Joseph C. Gil; Thomas W. Roy

[57]          ABSTRACT

The present invention relates to transparent coating compositions containing a binder and 0.5 to 25 wt. %, based on resin solids, of a material consisting of nanoscale primary particles obtained by jet dispersion of the nanoscale particles in the coating composition. The present invention also relates to a process for the production of these transparent coating compositions containing nanoscale particles by passing the coating compositions containing nanoscale primary particles and a binder in at least one pass through an apparatus which has at least one nozzle or at least one slit having a bore diameter or slit width of 0.05 to 1 mm and a length to diameter ratio of the bore or a depth to slit width ratio of the slit of 1 to 10, wherein there is a pressure differential between the nozzle inlet and outlet of at least 0.5, preferably of 1 MPa.

10 Claims, 1 Drawing Sheet

TRANSPARENT COATING COMPOSITIONS CONTAINING NANOSCALE PARTICLES AND HAVING IMPROVED SCRATCH RESISTANCE

BACKGROUND OF THE INVENTION

1. Field of the Invention

This invention relates to transparent coating compositions containing nanoparticles, to a process for their production and to their use for preparing coatings having improved scratch resistance.

2. Description of the Prior Art

The preparation of substantially nanoscale particles in an organic, inorganic or organic/inorganic matrix is of interest in many applications. Specific combinations of properties in coatings, such as transparency and wear resistance, may be obtained by using nanoparticles. It would be desirable, especially for high-grade transparent lacquer applications, to provide lacquer binders with nanoparticles such that, at constant transparency and gloss, an improvement in scratch resistance is obtained.

Various different processes may be considered for the production of preparations containing nanoscale particles.

Several processes are known for the production of dry nanoscale materials, which are used on a large industrial scale primarily in the production of pyrogenic silica (for example, the Aerosil process; the arc process, DE-A 1,180,723; and the plasma process, *Powder Technol.* 1978, 20, 159). These processes are described, inter alia, in *Chemische Technologie*, volume 2, *Anorganische Technologie*II, 4$^{th}$ edition, 1983, pg 77.

Further examples of the production of dry materials having primary particles which are nanoscale relate to the production of ceramic particles by matrix pyrolysis processes in a combustible support material as described, e.g., in EP-A 680,454 and EP-A 697,995.

With appropriate process control, the stated processes for the production of nanoscale powders do indeed yield primary particles which are nanoscale (approx. 5 to 50 nm diameter). However, the particles are not in the form of discrete particles, but instead predominantly assume the form of agglomerates due to consolidation of the primary particles. Such agglomerates may reach diameters of several thousand nanometers, such that the desired characteristics associated with the nanoscale nature of the particles cannot be achieved.

The particles may be deagglomerated, for example, by grinding as described in EP-A 637,616. Agglomerates may be reduced to one sixth of their size in this manner. However, the low space/time yield and the unavoidable contamination due to abrasion from the grinding additives are disadvantageous.

Previously, it has not been known how to produce agglomerate-free powders or powder preparations at reasonable cost from the available nanoscale powders containing agglomerates. Various alternative production processes have been developed in which products predominantly containing agglomerate-free nanoscale particles or composites may be produced by means of a controlled growth process starting from discrete low molecular weight starting materials or such materials in, for example, sol form.

It is thus possible using the sol/gel process, starting from metal alkoxides, to produce particles having an average diameter of below 50 nm by a controlled increase in molecular weight. Such systems are used, for example, as coating compositions or active substance precursors as described, e.g., in *The Polymeric Materials Encyclopedia*1996, volume 6, 4782–4792 et seq.).

Due to the great technical complexity that is generally associated with such production processes, the resultant products may be used in only limited applications. Such processes are also applicable to only a limited selection of different classes of chemicals.

Nanoscale metal oxide sols are also known. These are usually 30 to 50% colloidal solutions of metal oxides (Si, Al, Ti, Zr, Ta, Sn, Zn) having average particle sizes of 4 to around 60 nm in aqueous or organic media. It is possible to prevent such metal oxide sols from agglomerating by electric and/or steric stabilization of the particle surfaces. Aqueous silica sols may in particular be mentioned, which may be produced, for example, from alkaline solutions by ion exchange processes (for example *Ullmann's Encyclopedia of Industrial Chemistry*, 5$^{th}$ edition, volume A23, VCH-Verlag, Weinheim, 1993, pp. 614–629). Such products are commercially available, for example under trade names such as Levasil (Bayer AG).

The disadvantage of nanoparticle dispersions, such as silica sols or other metal oxide sols, resides in their strong tendency to agglomerate if the dissolving medium is removed or altered, such that it is not straightforwardly possible to incorporate them homogeneously into a foreign matrix, such as a lacquer (binder) formulation. Homogeneous incorporation into a lacquer (binder) formulation is possible by modifying the surface of the particles and adapting the solvent. Such a process (for example EP-A 768,351) is, however, highly technically complex and applicable only under certain circumstances.

EP-A 766,997 describes a process for the production of finely divided dispersions of solids. Using this process, it is possible to comminute suspended solid particles. The deagglomeration of materials consisting of nanoscale primary particles and their use in lacquer binders was not described in this document. The process is known as a jet dispersion process and is already used industrially for other purposes, such as finely dispersing immiscible liquid phases, such as water in oil. Production of improved two-component aqueous lacquer emulsions by means of finer emulsification may proceed, for example, in accordance with the process of EP-A 685,544.

It is an object of the present invention to provide a simple process for the production of transparent coating compositions, which contain nanoscale particles in order to improve properties, such as scratch resistance.

It has now surprisingly been found that by using the jet dispersion process described in EP-A 766,997 it is possible to bring about a distinct reduction in the agglomerate content of a predispersion of nanoparticles containing agglomerates. The dispersions of solids produced using this process may be used as lacquer binders for transparent coatings. The dispersions of nanoparticles have also proved to be particularly resistant to reagglomeration and settling in the presence of lacquer binders.

SUMMARY OF THE INVENTION

The present invention relates to transparent coating compositions containing a binder and 0.5 to 25 wt. %, based on resin solids, of a material consisting of nanoscale primary particles obtained by jet dispersion of the nanoscale particles in the coating composition.

The present invention also relates to a process for the production of these transparent coating compositions containing nanoscale particles by passing the coating compositions containing nanoscale particles and a binder in at least one pass through an apparatus which has at least one nozzle or at least one slit having a bore diameter or slit width of 0.05 to 1 mm and a length to diameter ratio of the bore or a depth to slit width ratio of the slit of 1 to 10, wherein there is a pressure differential between the nozzle inlet and outlet of at least 0.5, preferably of 1 MPa.

DETAILED DESCRIPTION OF THE INVENTION

Figure 1:
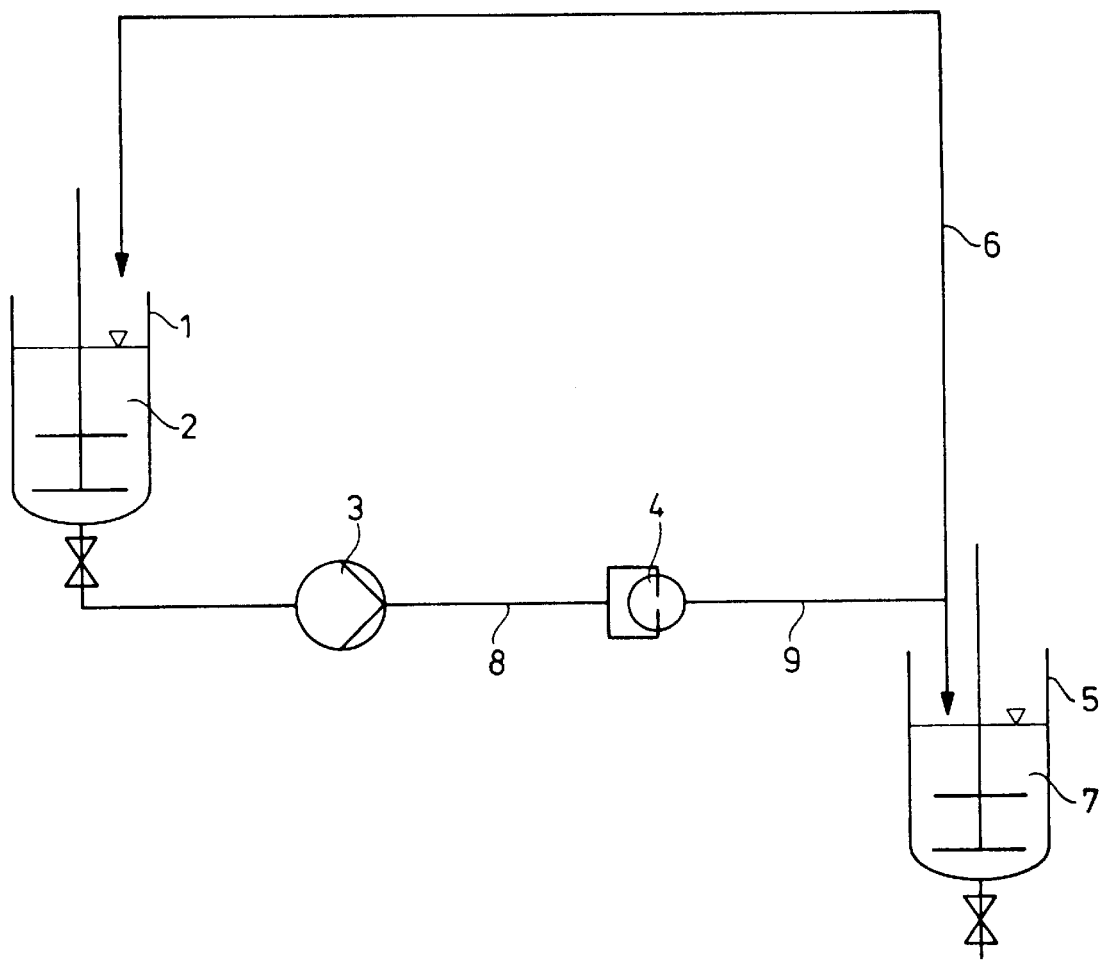
FIG. 1 shows an embodiment of the process of the present invention.

The transparent coating compositions containing solid nanoparticles according to the invention may be used as attractive starting materials for improving properties in areas where they could not previously be used due to the elevated agglomerate content, such as clear lacquer applications. It was also surprising that the use of these coating compositions modified with nanoparticles resulted in improved scratch resistance, especially in clear lacquer applications, and simultaneously brought about improved chemical resistance.

The transparent coating compositions according to the invention contain 0.5 to 25 wt. %, preferably 2 to 20 wt. %, based on the resin solids, of a material consisting of nanoscale primary particles incorporated as solids. The nanoparticles are deagglomerated by means of the dispersion process described in EP-A 766,997 (U.S. Pat. No. 5,810,266, herein incorporated by reference). They are advantageously used according to the invention in two-component polyurethane coating compositions. The coatings produced therefrom have 20° gloss values (to DIN 67530) of greater than 70, preferably greater than 80 and more preferably greater than 85.

The nanoscale materials containing agglomerates which are suitable as starting materials according to the invention are preferably powders or powder preparations. The primary particles are nanoscale, i.e. the average primary particle diameter thereof is below 200 nm, preferably below 100 nm and more preferably below 50 nm.

Examples include the pyrogenic silicas, nanoscale aluminum oxide and aluminum oxide hydrates, nanoscale grades of titanium dioxide and zirconium dioxide, which are also known as flatting agents, as well as other nanoscale oxides of the elements aluminum, titanium, zirconium, tantalum and tin which may be produced, for example, from sols. It is sometimes advantageous to also use surface-modified particles or to perform surface modification after deagglomeration to provide additional stabilization against reagglomeration and to reduce an undesirable excessive thixotropic effect.

Pyrogenic silicas are preferably used and may be obtained, for example, from the company Degussa under the trade name Aerosil. Surface-modified grades having a hydrophobic surface are particularly preferred for the above-stated reasons. Surface modification is conventionally achieved with compounds that are reactive towards Si—OH, such as octamethylcyclo-tetrasiloxane, octyltrimethoxysilane, hexamethyl-disilazane and dimethyldimethoxysilane. Examples of such products are Aerosil R 104, R 202, R 805, R 812, R 812, R 972 and R 974 from Degussa.

Nitrides and carbides of metals and semi-metals, for example boron, silicon and titanium, are also suitable as are any other desired inorganic compounds, such as $BaSO_4$, $TiO_2$, which are in the form of solid particles having a nanoscale primary structure. Any desired blends of various nanoscale materials having greater or lesser agglomerate contents may, of course, also be used.

Suitable binders for use in the coating compositions of the present invention the known resins from lacquer and coatings technology as described, for example, in *Lackharze, Chemie, Eigenschaften und Anwendungen*, eds. D. Stoye, W. Freitag, Hanser Verlag, Munich, Vienna, 1996.

Examples include polymers and copolymers of (meth) acrylic acids and the esters thereof, which may optionally contain other functional groups, with other olefinically unsaturated compounds, such as styrene. Other examples include polyether, polyester, polycarbonate, polyurethane and epoxy resins as well mixtures of these polymers.

Polymers bearing hydroxyl groups are preferred as the polymeric organic compounds, such as polyacrylate polyols, polyester polyols, polycaprolactone polyols, polyether polyols, polycarbonate polyols, polyurethane polyols, hydroxy-functional epoxy resins and mixtures of these polymers. Aqueous, solvent-based or solvent-free polyacrylate and polyester polyols and mixtures thereof are particularly preferred polymeric organic compounds.

Suitable polyacrylate polyols are copolymers of monomers containing hydroxyl groups with other olefinically unsaturated monomers, such as esters of (meth)acrylic acid, styrene, α-methylstyrene, vinyltoluene, vinyl ester, maleic and fumaric acid mono- and dialkyl esters, α-olefins and other unsaturated oligomers and polymers.

Particularly suitable polyacrylate polyols have a weight average molecular weight, determined by gel permeation chromatography (polystyrene standard), of 2000 to 100,000, preferably of 2500 to 50,000 and more preferably of 3000 to 40,000; a glass transition temperature, $T_g$, of −50° C. to +100° C., preferably of −40° C. to +90° C. and more preferably of −30° C. to +80° C.; an acid value of <30 mg of KOH/g, preferably of <25 mg of KOH/g; and a hydroxyl group content of 0.5 to 14.0, preferably of 0.5 to 10.0 and more preferably of 1.0 to 8.0 wt. %. These polyacrylate polyols contain a) 0 to 70 parts by weight, preferably 5 to 70 parts by weight, of an unsaturated, aromatic monomer, such as styrene, α-methylstyrene or vinyltoluene, b) 0 to 70 parts by weight, preferably 5 to 70 parts by weight, of a (cyclo)-aliphatic ester of acrylic and/or methacrylic acid having 1 to 18 carbon atoms in the (cyclo)alkyl residue, c) 4 to 95 parts by weight, preferably 10 to 60 parts by weight, of a hydroxy-alkyl ester of acrylic and/or methacrylic acid having 2 to 4 carbon atoms in the hydroxyalkyl residue and/or an adduct of a monoepoxide onto acrylic and/or methacrylic acid, d) 0 to 10 parts by weight, preferably 0.1 to 5 parts by weight, of an α,β-monoolefinically unsaturated mono- or dicarboxylic acid having 3 to 7 carbon atoms and/or a maleic or fumaric acid semi-ester having 1 to 14 carbon atoms in the alcohol residue, and e) 0 to 30 parts by weight, preferably 0 to 20 parts by weight, of another copolymerizable, olefinically unsaturated or polyunsaturated, monomeric and/or polymeric compounds.

The described hydroxy-functional polyols containing nanoparticles may be used in both one-component and two-component coating compositions together with the known curing agents from coatings technology. Suitable curing agents include polyisocyanates or polyisocyanates blocked with reversible blocking agents, such as methyl ethyl ketoxime, caprolactam, malonic acid esters, triazole or 2,5-dimethylpyrazole. Also suitable are melamine/formaldehyde resins, which may optionally be partially etherified, as are described, e.g., *Lackharze, Chemie, Eigenschaften und Anwendungen*, eds. D. Stoye, W. Freitag, Hanser Verlag, Munich, Vienna, 1996.

It is preferred to use the aqueous or solvent-borne binders according to the invention in two-component coating compositions in combination with polyisocyanates. Examples of suitable polyisocyanates include hexamethylene diisocyanate, isophorone diisocyanate, 4,4'-diisocyanato-dicyclohexylmethane, tetramethylene diisocyanate, 2-methylpentamethylene diisocyanate, 2,2,4- and 2,4,4-trimethylhexa-methylene diisocyanate (THDI), 1,4-diisocyanato-cyclohexane, 3-isocyanatomethyl-1-methyl-1-isocyanato-cyclohexane (IMCI), , , ''-tetramethyl-m- or p-xylylene diisocyanate (TMXDI), 1,4- and 1,3-xylylene diisocyanate (XDI), hexahydroxylylene diisocyanate (H6-XDI) and mixtures thereof. Also suitable for aqueous binders are hydrophilically modified polyisocyanates, such as those described, e.g., DE-A 4,136,618 (U.S. Pat. No. 5,252,696, herein incorporated by reference). The polyisocyanates based on hexamethylene diisocyanate, isophorone diisocyanate and 4,4'-diisocyanatodicyclohexyl-methane are particularly preferred.

These polyisocyanates are used as curing agents in high-grade polyurethane coating compositions which exhibit outstanding chemical resistance and an elevated degree of gloss. A binder containing excessively large particles would be discernible by a distinct reduction in gloss. However, improved scratch resistance may be achieved at constant gloss and transparency with the binder according to the invention.

The binders according to the invention are particularly suitable for the production of clear lacquers, because it is possible to achieve significant improvements in properties, such as scratch resistance, while retaining transparency and an elevated degree of gloss. Clear coating applications, in which the binder according to the invention results in particularly distinct advantages, include original and refinish automotive coatings, abrasion-resistant coatings for parquet and other flooring, and anti-graffiti coatings on exterior walls and masonry.

The apparatus described and illustrated in EP-A 766,997 is preferably used in the process according to the invention. The apparatus contains at least of one high pressure chamber and one low pressure chamber to receive the dispersion and an intermediate comminuting nozzle having a hole or slit, wherein the bore diameter or slit width of the nozzle is 0.05 to 1 mm, preferably 0.1 to 0.5 mm, and the length to diameter ratio of the bore or the depth to slot width ratio of the slit of the nozzle is 1 to 10. Preferred nozzles are those having at least two bores or slots with opposing outlets. Particularly preferred nozzles are those in which the distance between the outlets of the at least two opposing nozzles or slits is two to fifty times the bore diameter or slit width respectively. Preferred materials for the production of the nozzles are ceramic materials, preferably oxide and graphite materials, or optionally materials coated with these ceramics.

A pressure of 5 to 50 MPa, preferably of 7 to 30 MPa, is used during performance of the process. It may optionally be convenient to use jet dispersers in which two or more nozzles connected in series are provided, such that the dispersion is passed repeatedly in succession through these nozzles. When the compositions are subjected to two or more passes through the nozzles of the jet dispersers, an increased pressure corresponding to the number of nozzles must be used. However, more than three passes through the nozzles generally result in no further substantial improvement.

If necessary, the material to be deagglomerated may be subjected to the multi-stage dispersion process as often as desired.

In process according to the invention the nanoscale material to be deagglomerated, which is generally already in fine powder form, is suspended in a suitable liquid medium. This suspension may be prepared, for example, using known methods, for example by stirring or incorporating in a high speed mixer.

When the process according to the invention is performed for predominantly inorganic nanoparticles, known solvents are suitable as dispersants. Examples include aromatic, aliphatic, aralipthatic or cycloaliphatic hydrocarbons; partially or completely halogenated aromatic, aliphatic, aralipthatic or cycloaliphatic hydrocarbons; alcohols such as methanol, ethanol, i-propanol, butanol, benzyl alcohol and diacetone alcohol; esters such as ethyl acetate, propyl acetate and butyl acetate; ether esters such as methoxypropyl acetate and ethylene glycol monobutyl ether acetate; ketones such as acetone, methyl ethyl ketone, methyl isobutyl ketone and cyclohexanone; and strongly polar solvents such as N,N-dimethylformamide, N,N-dimethylacetamide, dimethyl sulfoxide and N-methylpyrrolidone.

Other suitable dispersants include water; liquid acid esters such as phosphoric acid dibutyl ester, phosphoric acid tributyl ester and sulfonic acid esters; borates or silicic acid derivatives such as tetraethoxysilane, methyltrimethoxysilane, 3-aminopropyl-trimethoxysilane, 3-aminopropyl-triethoxysilane, glycidyloxypropyl-trimethoxysilane and glycidyloxy-propyltriethoxysilane. Liquefied carbon dioxide may also be used as a dispersant.

The dispersion operation according to the invention may also be performed at elevated temperatures of up to 200° C. In this case, it is also possible to use high molecular weight compounds, which are highly viscous or solid at room temperature as dispersants.

Other substances may be added to the materials used as dispersants. Preferred substances are those which are also intended for subsequent use, e.g., those which improve deagglomeration or improve the properties, such as the stability, of the deagglomerated materials. Particularly preferred are oligomeric or polymeric organic compounds, such as the known resins and binders to be used in the coating compositions.

A portion of the resins used in the multi-component coating compositions, e.g, as curing agents (amine and melamine resins, polyisocyanates, polyisocyanate adducts and blocked polyisocyanates), may also be used in the dispersing medium. These resins may be exclusively used as the dispersing medium if the solvent-free resin has a viscosity which is not too high for performance of the process according to the invention.

When water is used as a substantial portion of the dispersing medium, suitable additives are in particular water-soluble or water-compatible compounds, such as partially or completely saponified polyvinyl acetate or hydrophilic variants of the above-stated classes of compounds. Further suitable additives preferably used in aqueous medium include silica sol and the sols of metal oxides of the elements aluminum, titanium, zirconium, tantalum and tin.

Suitable low molecular weight additives, which may be used to stabilize the deagglomerated nanoscale particles against reagglomeration, include compounds that are suitable for stabilizing nanoscale particles which are produced in a different manner, for example, using one of the above-stated methods. Examples include compounds having hydrolyzable silane groups, such as alkoxy- or chlorosilanes. Certain amphiphilic compounds may also be used. The solvents and additives suitable for the production of the dispersing medium may be blended together as desired.

The coating compositions according to the invention may be blended with any known curing agents or mixtures thereof to produce coatings.

To obtain the increased efficiency of the process according to the invention, the viscosity of the dispersing medium at the selected processing temperature should not exceed 10,000 mPa·s, preferably 5000 mPa·s and more preferably 2000 mPa·s.

In a preferred embodiment of the process, the pulverulent, a material consisting of nanoscale primary particles, is introduced in portions into the polyol component, which has been diluted with solvents to obtain a viscosity of less than 2000 mPa·s, in a high speed stirrer and deagglomerated as described. The mixture preferably contains 0.5 to 25 wt. %, preferably 2 to 20 wt. %, based on the solids content, of a material consisting of nanoscale primary particles.

The invention is exemplified below with reference to the figures.

In the embodiment shown in FIG. 1 dispersion 2 is passed from storage tank 1 equipped with a stirrer via pump 3 and high pressure line 8 into the high pressure side of nozzle 4. The dispersion passes through nozzle 4 and is passed via low pressure line 9 either into tank 5, which holds the finer coating composition 7 according to the invention, or through return line 6 into starting tank 1 for another pass.

Figure 2:
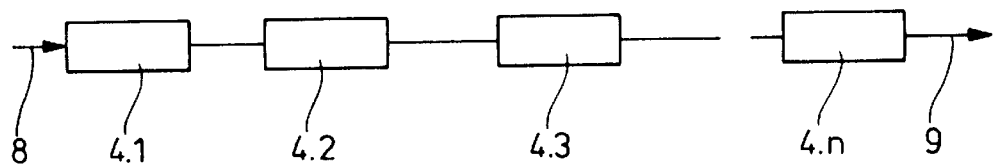
FIG. 2 shows an n-stage nozzle arrangement used in the process of the present invention.

According to FIG. 2, several comminuting nozzles 4.1, 4.2, 4.3 and 4.n may be connected directly in series in order to improve the deagglomerating action.

EXAMPLES

In the Examples all Percentages are by Weight.
Production of the Coating Compositions According to the Invention Polyol 1 (polyacrylate with an OH-content of 3% (Desmophen LS 2009/1, Bayer AG) was diluted to a solids content of 40% by addition of the solvent mixture. The solid nanoparticles were added in portions with continuous stirring until a content of 20%, based on the solids content of the binder, was achieved.

Additional solvent mixture was then added in order to obtain the solids content and equivalent weight according to table 1. Polyols 2 and 3 (comparison examples not according to the invention) were used without further treatment. Polyols 4 to 8 according to the invention were passed three times through the jet dispersion apparatus (FIG. 5 of U.S. Pat. No. 5,810,266, 0.2 mm $ZrO_2$ nozzles) at the stated pressure.

TABLE 1

| Polyol | Nanoparticle | Pressure for dispersion process [MPa] | % Solids content | Equivalent weight |
|---|---|---|---|---|
| Polyol 1 | — | — | 70.0 | 567 |
| Polyol 2 | Aerosil 300 | — | 44.4 | 1072 |
| Polyol 3 | Aerosil R 812 | — | 44.4 | 1072 |
| Polyol 4 | Aerosil 300 | 23 | 44.4 | 1072 |
| Polyol 5 | Aerosil R 812 | 23 | 44.4 | 1072 |
| Polyol 6 | Aerosil R 104 | 23 | 44.4 | 1072 |
| Polyol 7 | Aerosil R 972 | 23 | 41.5 | 1107 |
| Polyol 8 | Aerosil R 974 | 23 | 44.4 | 1072 |

The ready-to-spray mixtures were produced by initially combining the polyols set forth in table 2 in a metal container with the solvent mixture and additives and homogenizing them by shaking or stirring. The curing agent, a polyisocyanate (Desmodur N 3390, Bayer AG) was then added and the mixture was homogenized again. The formulations were sprayed using the crosshatching technique onto primed sheet steel (for testing chemical resistance), onto aluminum sheet primed and coated with a black basecoat (Spies & Hecker series 293, deep black) (for testing scratch resistance) and onto glass sheets (for testing hardness and solvent resistance). After partial drying for five minutes at room temperature, the coating compositions were stoved for 30 minutes at 140° C. Testing was performed after an additional 16 hours at 60° C.

Gloss was determined to DIN 67 530, haze according to ISO/CD 13 803, pendulum damping according to DIN ISO 1522 and drain time according to DIN EN ISO 2431.

The lacquer coated aluminum sheets were scratched using a laboratory carwash simulator from Amtec Kistler GmbH. The sheets were washed 10 times with a polyethylene brush at a water temperature of 15 to 25° C. with the addition of 1.5 g/l of silica flour (Sikron-Feinstmehl SH 200, average grain size 24 μm).

The chemical resistance test was performed using the gradient oven method (gradient oven model 2611 from Byk-Gardner). Testing was performed on steel sheets specially intended for this purpose (Franz Krüppel-Industriebedarf), which were exposed for 30 minutes to a temperature gradient from 36 to 75C (50% relative humidity). The samples were evaluated after storage for 1 hour and 24 hours under standard climatic conditions (23° C., 50% relative humidity). The stated test result for each chemical was the temperature at which the first visible damage occurred (unassisted). The test results are set forth in table 3.

TABLE 2

| Component (wt. in g) | Comparison. 1 | Comparison. 2 | Comparison. 3 | Example 1 | Example 2 | Example 3 | Example 4 | Example 5 |
|---|---|---|---|---|---|---|---|---|
| Polyol 1 | 79.2 | 48.74 | 48.74 | 48.74 | 48.74 | 48.74 | 48.68 | 48.74 |
| Polyol 2 | | 38.77 | | | | | | |
| Polyol 3 | | | 38.77 | | | | | |
| Polyol 4 | | | | 38.77 | | | | |
| Polyol 5 | | | | | 38.77 | | | |
| Polyol 6 | | | | | | 38.77 | | |
| Polyol 7 | | | | | | | 40.56 | |
| Polyol 8 | | | | | | | | 38.77 |
| Solvent mixture | 50.6 | 51.6 | 39.6 | 50.7 | 39.6 | 39.2 | 34.1 | 40.1 |
| Additive 1 | 0.82 | 0.75 | 0.75 | 0.75 | 0.75 | 0.75 | 0.75 | 0.75 |
| Additive 2 | 0.82 | 0.75 | 0.75 | 0.75 | 0.75 | 0.75 | 0.75 | 0.75 |
| Polyisocyanate | 30.10 | 26.38 | 26.38 | 26.38 | 26.38 | 26.38 | 26.38 | 26.38 |
| Solids content in % | 46 | 45 | 48 | 45 | 48 | 49 | 50 | 48 |
| $SiO_2$ content based on binder solids in % | 0 | 5 | 5 | 5 | 5 | 5 | 5 | 5 |
| ISO 5 drain time in sec | 23 | 24 | 23 | 25 | 25 | 24 | 22 | 23 |

Solvent mixture: 50% MPA, 50% solvent naphtha SN 100 ®
Additive 1: Baysilone OL 17, 10% in MPA; catalyst - dibutyltin dilaurate (DBTL), 50% in MPA

TABLE 3

| System | | Comparison 1 | Comparison 2 | Comparison 3 | Example 1 | Example 2 | Example 3 | Example 4 | Example 5 |
|---|---|---|---|---|---|---|---|---|---|
| Pendulum damping in s | | 194 | 155 | 189 | 192 | 188 | 195 | 188 | 187 |
| Film thickness in m | | 40 | 40 | 40 | 30 | 40 | 40 | 40 | 50 |
| Solvent resistance | | | | | | | | | |
| X, MPA, EA, AC | 1 min | 0  012 | * | * | 0  002 | 0  012 | 0  012 | 0  012 | 0  002 |
| | 5 min | 0  022 | * | * | 0  012 | 0  022 | 0  012 | 0  012 | 0  022 |
| Chemical resistance | | | | | | | | | |
| Tree resin | 1 h/24 h | 36/36 | * | * | 54/54 | 46/46 | 48/48 | 50/50 | 46/46 |
| Brake fluid | in ° C. | 36/36 | * | * | 36/36 | 36/36 | 36/36 | 36/36 | 36/36 |
| Pancreatin | | 36/40 | * | * | 48/48 | 36/36 | 36/36 | 38/46 | 46/46 |
| NaOH, 1% | | 53/53 | * | * | 56/62 | 53/53 | 56/56 | 58/58 | 52/52 |
| $H_2SO_4$, 1% | | 42/42 | * | * | 50/50 | 48/48 | 51/51 | 48/48 | 51/51 |
| FAM, 10 min | | 0 | * | * | 0 | 0 | 0 | 0 | 0 |
| Optical properties | | clear | Matt | matt | trace matt | Clear | clear | clear | clear |
| Scratch resistance | | | | | | | | | |
| Average haze before | | 12.8 | >300 | >300 | 38.7 | 17.8 | 14.0 | 13.0 | 13.3 |
| Average haze after | | 97 | * | * | 100 | 91.2 | 84.1 | 86.1 | 91.2 |
| Average Δ haze | | 84.2 | * | * | 61.3 | 73.4 | 70.1 | 73.1 | 77.9 |
| Average 20° gloss before | | 91.3 | 31.0 | 55.0 | 88.8 | 90.1 | 90.7 | 90.8 | 90.7 |
| Average 20° gloss after | | 44.8 | * | * | 44.7 | 49.3 | 50.5 | 49.7 | 48.8 |
| Average Δ gloss | | 46.5 | * | * | 44.1 | 40.8 | 40.2 | 41.1 | 41.9 |
| Improvement in haze vs. Comparison 1 in % | | | | | 27 | 13 | 17 | 13 | 7 |
| Improvement in gloss vs. Comparison 1 in % | | | | | 5 | 12 | 14 | 12 | 10 |

* = due to poor optical properties, no further assessment possible.
Solvent resistance values, FAM: 0 = no change, 1 = trace change, 2 = slight change, 3 = moderate change, 4 = severe change, 5 = film totally destroyed. X = xylene; MPA = methoxypropyl acetate; EA = ethyl acetate; AC = acetone.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A transparent coating composition containing a binder and 0.5 to 25 wt. %, based on resin solids, of a material consisting of nanoscale primary particles obtained by jet dispersion of the nanoscale particles in the coating composition.

2. The transparent coating composition of claim 1 wherein the binder comprises a polyacrylate polyol, a polyester polyol, a polycaprolactone polyol, a polyether polyol, a polycarbonate polyol, a polyurethane polyol, a hydroxyfunctional epoxy resins or a mixture thereof.

3. The transparent coating composition of claim 1 wherein the nanoscale particles comprise pyrogenic silica.

4. The transparent coating composition of claim 2 wherein the nanoscale particles comprise pyrogenic silica.

5. The transparent coating composition of claim 1 wherein the nanoscale particles comprises hydrophobic, pyrogenic silica.

6. The transparent coating composition of claim 2 wherein the nanoscale particles comprises hydrophobic, pyrogenic silica.

7. The transparent coating composition of claim 2 wherein the binder is a two-component binder and additionally contains an aliphatic polyisocyanate.

8. The transparent coating composition of claim 4 wherein the binder is a two-component binder and additionally contains an aliphatic polyisocyanate.

9. The transparent coating composition of claim 6 wherein the binder is a two-component binder and additionally contains an aliphatic polyisocyanate.

10. A process for the production of a transparent coating composition containing a material consisting of nanoscale primary particles which comprises passing the coating composition containing nanoscale particles and a binder in at least one pass through an apparatus which has at least one nozzle or at least one slit having a bore diameter or slit width of 0.05 to 1 mm and a length to diameter ratio of the bore or a depth to slit width ratio of the slit of 1 to 10, wherein there is a pressure differential between the nozzle inlet and outlet of at least 0.5 MPa.

* * * * *